United States Patent
Cook

(10) Patent No.: US 7,917,625 B1
(45) Date of Patent: Mar. 29, 2011

(54) PREDICTIVE PROCESSING RESOURCE LEVEL CONTROL

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1585 days.

(21) Appl. No.: 11/036,311

(22) Filed: Jan. 14, 2005

(51) Int. Cl.
*G06F 15/163* (2006.01)

(52) U.S. Cl. ........................ 709/226; 370/254

(58) Field of Classification Search .......... 370/254–255; 709/220–226
See application file for complete search history.

(56) References Cited

U.S. PATENT DOCUMENTS

| | | | | |
|---|---|---|---|---|
| 5,996,013 | A * | 11/1999 | Delp et al. | 709/226 |
| 6,125,105 | A * | 9/2000 | Edwards et al. | 370/230 |
| 6,240,453 | B1 * | 5/2001 | Chang et al. | 709/226 |
| 6,327,622 | B1 * | 12/2001 | Jindal et al. | 709/228 |
| 6,353,847 | B1 * | 3/2002 | Maruyama et al. | 718/105 |
| 6,463,454 | B1 * | 10/2002 | Lumelsky et al. | 718/105 |
| 6,516,350 | B1 * | 2/2003 | Lumelsky et al. | 709/226 |
| 6,584,330 | B1 | 6/2003 | Ruuska | |
| 6,862,623 | B1 * | 3/2005 | Odhner et al. | 709/226 |
| 7,054,943 | B1 * | 5/2006 | Goldszmidt et al. | 709/229 |
| 7,133,907 | B2 * | 11/2006 | Carlson et al. | 709/220 |
| 7,249,179 | B1 * | 7/2007 | Romero et al. | 709/226 |
| 2002/0194326 | A1 * | 12/2002 | Gold et al. | 709/224 |
| 2003/0023885 | A1 | 1/2003 | Potter et al. | |
| 2003/0135621 | A1 * | 7/2003 | Romagnoli | 709/226 |
| 2003/0208523 | A1 * | 11/2003 | Gopalan et al. | 709/201 |
| 2004/0039954 | A1 | 2/2004 | White et al. | |
| 2004/0054780 | A1 * | 3/2004 | Romero | 709/226 |
| 2004/0255295 | A1 * | 12/2004 | Stackhouse et al. | 718/100 |
| 2005/0262235 | A1 * | 11/2005 | Childress et al. | 709/224 |

OTHER PUBLICATIONS

Merriam-Webster Online Dictionary, "definition of alert." 2009. Merriam-Webster Online.*
The Next Wave: Blade Server Computing, Sun Microsystems, Feb. 2002, pp. 1-17.

* cited by examiner

*Primary Examiner* — Aung S Moe
*Assistant Examiner* — Curtis A Alia

(57) ABSTRACT

Pooled resources including remotely startable and stoppable computing resources are activated according to a predictive load model. The model includes alert events for providing respective resource activation levels representing either an increase or a decrease in the resource utilization model expected to occur after the respective alert events. If a detected alert event corresponds to an increase, then selected ones of the pooled resources are started. If the detected alert event corresponds to a decrease, then an actual load level is checked, and selected ones of the pooled resources are stopped if the actual load level is less than the respective resource activation level corresponding to the detected alert event.

18 Claims, 3 Drawing Sheets

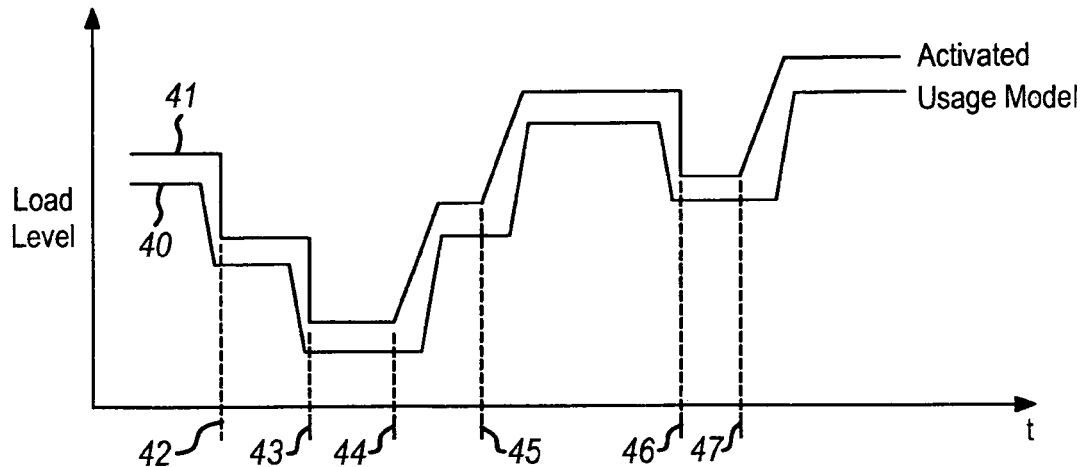

FIG. 3

| Alert Event | Change | Units of Capacity |
|---|---|---|
| 06:45:00 Monday-Friday | Increase | 75 |
| 08:50:00 Monday-Friday | Increase | 90 |
| 11:50:00 Monday-Friday | Decrease | 80 |
| 12:55:00 Monday-Friday | Increase | 90 |
| 16:30:00 Monday-Thursday | Decrease | 75 |
| 16:30:00 Friday | Decrease | 80 |
| 21:00:00 All Days | Decrease | 65 |
| 23:30:00 All Days | Decrease | 40 |
| 07:20:00 Saturday/Sunday | Increase | 50 |
| 10:40:00 Saturday/Sunday | Increase | 65 |
| 16:15:00 Saturday/Sunday | Increase | 70 |
| 08:15:00 May 8, 2005 | Increase | 75 |
| 10:45:00 May 8, 2005 | Increase | 100 |
| 21:00:00 May 8, 2005 | Decrease | 85 |
| Occurrence: More Than Two Other Pools Experiencing Loads Over Their Models | Increase | Based On Percentage Of Excess Loads In Other Pools |

FIG. 4

PREDICTIVE PROCESSING RESOURCE LEVEL CONTROL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to minimizing electrical power consumption of pooled computer resources, and, more specifically, to turning pooled resources on and off in an efficient manner that maintains quality of service (QoS) from a service delivery network.

Service delivery networks for providing telecommunication and/or data processing services such as web pages or electronic multimedia typically use pooled computer resources in a co-located facility or data center. Computing grids employ a large number of pooled computer resources that may be allocated on request to users within a group. A primary difficulty faced by service providers utilizing pooled computing resources relates to electrical power consumption and heat production. As computer processors have become increasingly powerful, they have also become increasingly power hungry and hot. In response, microprocessor chip manufacturers have taken steps to limit the power consumption and heat production using processor power management schemes such as variable clock rates and by developing multi-core processor chips. Some manufacturers are working on shutting down portions of a processor when they are not needed so that power consumption and heat production can be reduced.

While processor chip improvements are helpful, a great deal of electrical power continues to be wasted in many applications. Demands for capacity from a particular service can vary significantly during a day (e.g., up to 500% variations). Resources that are not utilized or are underutilized waste power and create unnecessary heat by operating the associated microprocessors and also the support components and peripherals associated with the microprocessor or computer.

Computing resources such as standalone computers and servers or individual processing blades in blade servers or clusters are known which are capable of being remotely stopped (i.e., powered down) and restarted. Attempts have been made to match active resource levels of pooled resources to the actual demand for services by activating only those resources necessary to meet the current demand. Such systems suffer a serious drawback, however, in that the restart time after a computer or blade has been shut down is sufficiently long that computer processing performance of the system lags behind the increase in demand.

Quality of Service (QoS) relates to the obligation of a service provider to maintain performance levels in accordance with certain guaranteed criteria. For example, transmission rates and/or error rates at a guaranteed level may be needed for purposes of transmitting video and/or multimedia data. Under fluctuating load conditions, when increased resources become necessary QoS levels may be adversely affected by the inherent time delays associated with restarting halted resources. The lead-time for adding additional capacity from halted resources in a pool includes time for starting associated hardware, loading an operating system, and loading the appropriate applications run by the resource. Thus, prior art attempts to reduce electrical power consumption have not been appropriate in the context of a service provider that needs to guarantee a particular QoS.

SUMMARY OF THE INVENTION

The present invention has the advantage of reducing electrical power consumption and heat generation without impacting quality of service (QoS) while dormant resources are re-started.

In one aspect of the invention, a method is provided for controlling the activation of pooled resources in a network, wherein the pooled resources include remotely startable and stoppable computing resources, and wherein starting of each of the computing resources requires a respective startup time. A resource utilization model is established including alert events for providing respective resource activation levels representing either an increase or a decrease in the resource utilization model expected to occur after the respective alert events. Occurrence of an alert event is detected. If the detected alert event corresponds to an increase, then selected ones of the pooled resources are started. If the detected alert event corresponds to a decrease, then an actual load level is checked, and selected ones of the pooled resources are stopped if the actual load level is less than the respective resource activation level corresponding to the detected alert event.

BRIEF DESCRIPTION OF THE DRAWINGS

FIG. 3 is a plot showing one embodiment of a relationship between a network usage model and a resource activation level to support QoS.

FIG. 4 is a table showing alert events in a resource utilization model.

DETAILED DESCRIPTION OF PREFERRED EMBODIMENTS

Figure 1:
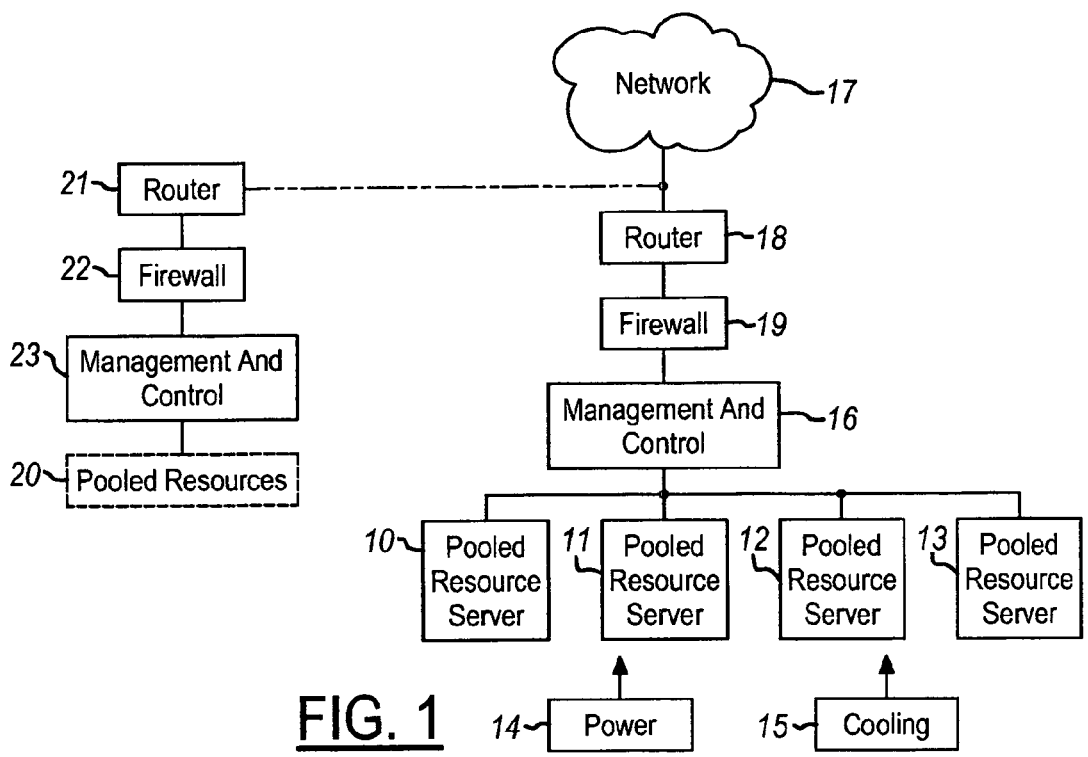
FIG. 1 is a block diagram of a network architecture for delivering network services with reduced power consumption according to the invention.

Referring now to FIG. 1, a plurality of pooled resource servers 10-13 receive electrical power from a power source 14 and are cooled by a cooling system 15 (which may include a room air conditioning system). A management and control resource 16 makes the computing services of pooled resource servers 10-13 available to remote users via network 17. A router 18 and a firewall 19 are used to couple management and control resources 16 to network 17. Management and control resource 16 performs a load balancing function for directing service requests received from network 17 to the pooled resources in a distributed manner. In a preferred embodiment of the present invention, management and control resource 16 remotely controls the on or off states of pooled resources 10-13 such that excess resources are not activated and yet QoS levels are maintained by activating resources prior to expected load increases in a predictive manner.

As described below, predicted load variations are determined using a resource utilization model maintained within management and control resource 16, for example. The model includes alert events which provide respective resource activation levels representing either an increase or a decrease in resource utilization expected to occur shortly after the respective alert events. Alert events typically comprise timed events such as times of day on specified days of the week or special dates (e.g., holidays). Alert events may also comprise predetermined occurrences happening outside the pooled resource system controlled by management and control resource 16. For example, pooled resources 20 providing related services may experience a significant load variation which is communicated to management and control process 16 as a predetermined occurrence. Pooled resources 20 are coupled to a router 21 via a firewall 22 and its own local management and controlled resource 23. Router 21 is coupled to router 18 providing a communication path to management and control resource 16 for signaling the predetermined occurrence.

Figure 2:
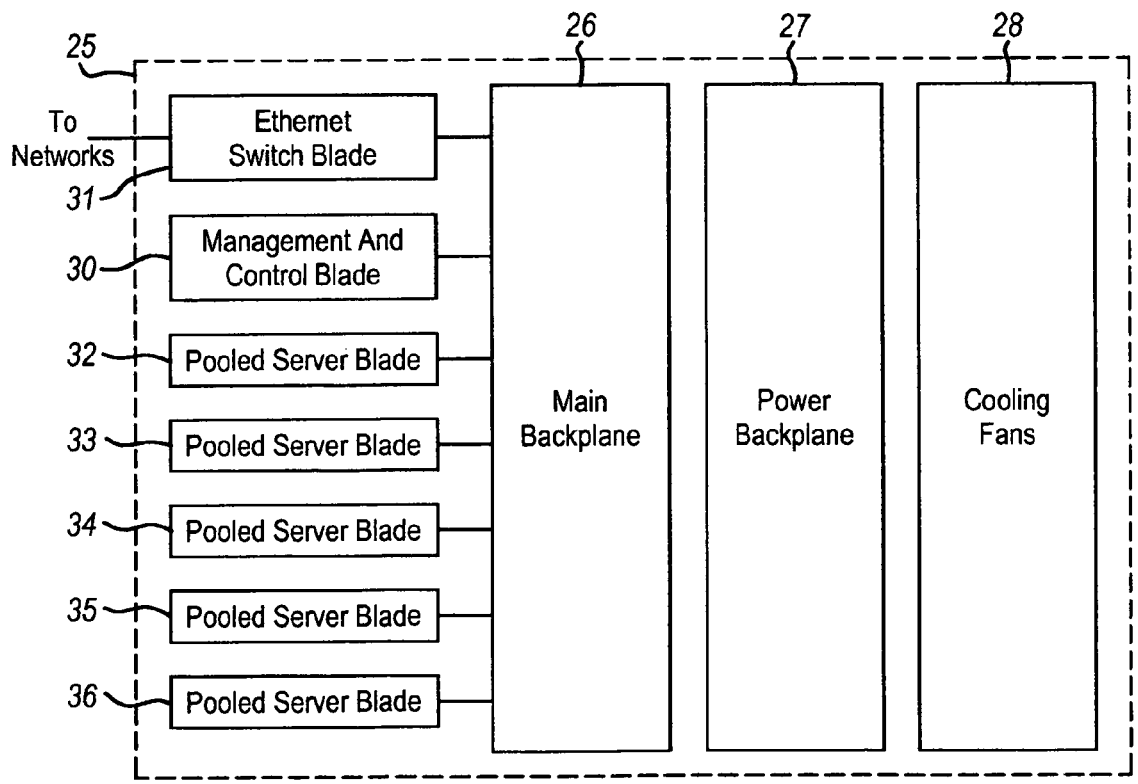
FIG. 2 is a block diagram showing an alternative configuration of pooled resources including blade servers.

Pooled resource servers 10-13 in FIG. 1 may comprise separate computing devices (i.e., standalone machines) installed in a data center as part of a cluster or a grid, for example. Management and control resource 16 typically resides on a separate machine. The resource utilization model and its activation/deactivation control function may be incorporated into resource 16 or may be incorporated into one of the servers 10-13. FIG. 2 shows an alternative service delivery architecture utilizing blade servers. A blade is a thin circuit board based processing system. A rack or other enclosure 25 contains a main backplane 26, a power backplane 27, and cooling fans 28 which are shared amongst a plurality of blades. A management and control blade 30 and an Ethernet switch blade 31 are interconnected with backplanes 26 and 27. Ethernet switch blade 31 is coupled to a network via a router and a firewall as shown in FIG. 1, for example. Incoming packets delivered to Ethernet switch blade 31 are examined by management and control blade 30 as is known in the art and distributed to selected ones of pooled server blades 32-36. Each pooled server blade is remotely is startable and stoppable under control of management and control blade 30. As in the case of pooled resource servers 10-13 in FIG. 1, pooled server blades 32-36 require a respective startup time in order to perform a power-on self-test, boot up an operating system, and load any applications. Although the startup time for a server blade may be somewhat less than a separate server machine, the time required would still significantly impact QoS levels if a blade were only started when the currently activated blades become insufficient to handle current traffic loads.

In order to insure that sufficient pooled resources are active and available to respond to expected loads without creating unnecessary power consumption, a resource utilization model and a resource activation level are utilized as shown in FIG. 3. A resource utilization model is represented in FIG. 3 by a curve 40 plotting a load level over time. Thus, during particular times of day, days of the week, and special dates such as holidays, a service provider can statistically predict an anticipated load level. A curve 41 shows a target minimum level of activated resources in order to meet anticipated load level demands, preferably maintaining a small cushion of excess capacity to handle small variations in peak load. As the usage model 40 varies between substantially steady state values throughout a day, alert events 42-47 are defined in order to track the variations in predicted usage.

FIG. 4 shows one preferred representation of the resource utilization model wherein alert events defined in terms of time of day, day of week, special dates, and predetermined occurrences provide a corresponding resource activation change as an increase or decrease and a target resource activation level in terms of units of computing capacity (which may be represented as an absolute number of resources or a percentage of full capacity). For simplicity in FIG. 4, it is assumed that 100 units of capacity are available. Various increases and decreases are shown during a typical weekday to follow commercial activity, for example. Different load levels are predicted during weekends and during a holiday (e.g., representing a higher than normal usage of telecommunication services on Mother's Day). Also shown is a predetermined occurrence of more than two other resource pools experiencing load over their resource utilization models, resulting in an increase of resource activation by an amount based on a percentage of the excess load being experienced by the other resource pools. Those skilled in the art will appreciate that many other types of occurrences and methods for defining capacity changes are possible.

Figure 5:
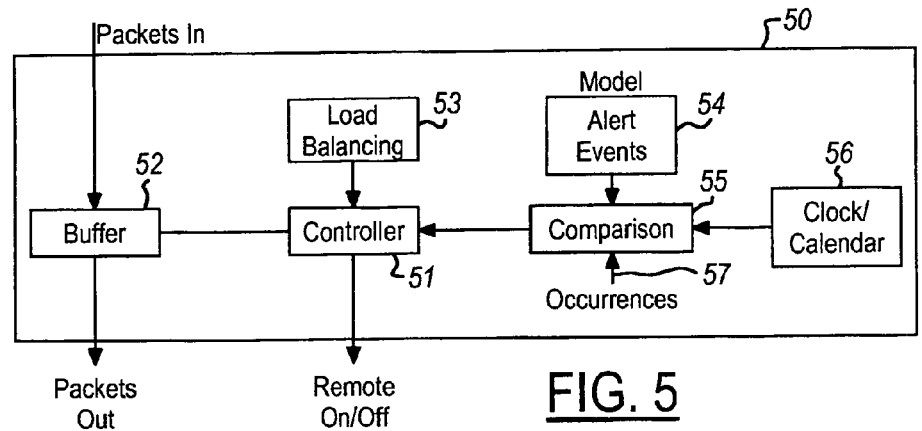
FIG. 5 shows a management and control resource in greater detail.

FIG. 5 shows a management and control resource 50 of the present invention in greater detail. A controller 51 is connected to a packet buffer 52 which receives packets from a network and provides packets out to identified pooled resources. Controller 51 is coupled to a load balancing process 53 for determining appropriate distribution of load levels as is known in the art. Load balancing process 53 monitors the overall load level and the load levels of individual pooled resources. Controller 51 is coupled to the pooled resources for remotely starting and stopping the resources either in response to the resource utilization model or in response to actual load levels that may exceed the model. A resource utilization model 54 includes alert events that are provided to a comparison block 55. For timed alert events, a clock/calendar 56 is coupled to comparison block 55 such that comparison block 55 detects occurrences of each particular alert event and signals controller 51 of the corresponding increase or decrease to be made in the activated resource level. Comparison block 55 also includes an occurrence input 57 responsive to predetermined occurrences such as reports of excess load levels from other pooled resources.

Figure 6:
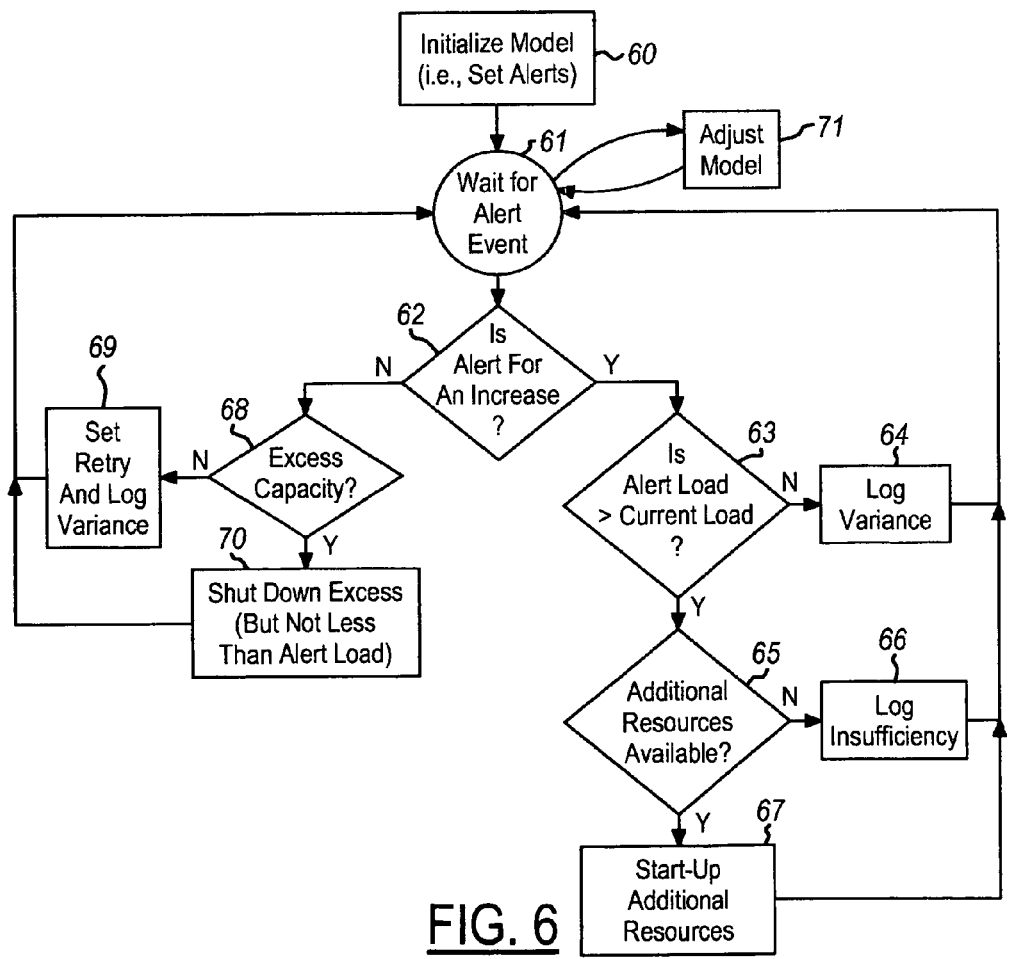
FIG. 6 shows a preferred method of the invention.

A preferred method of the present invention is shown in FIG. 6. The management and control resource initializes the resource utilization model in step 60 by setting appropriate alert events. The method of the invention then waits for the occurrence of an alert event in step 61. Once an alert event occurs, a check is made in step 62 to determine whether the alert event is for an increase in resources. If so, then a check is made in step 63 to determine whether the resource capacity associated with the alert event is greater than the current load (as determined by the load balancing process). If the current load is already greater than the alert capacity, than the variance is logged in step 64 (i.e., indicating usage already over the predicted level) and a return is made to step 61 to await the next alert event. If the load level associated with the alert is greater than the current load, then a check is made in step 65 to determine whether additional resources are available. If not, then the insufficiency is logged in step 66 and a return is made to step 61. If additional resources are available, then the additional resources are started up in step 67 and a return is made to step 61.

If the alert event in step 62 relates to a decrease, then a check is made in step 68 to determine whether excess capacity is in fact running (i.e., whether the resource activation level identified by the alert event is greater than the current load). If there is not excess capacity, then the variance is logged in step 69 and a reconfigurable retry alert event may be set in step 69. For example, the alert event can be deferred by a predetermined amount of time. If excess capacity is found in step 68, then it is shut down in step 70. If the actual load is intermediate between the current available resources and the predicted load, then an intermediate amount of resources may be shut down. If an intermediate amount of resources are shut down, then a retry alert event may also be created to attempt to reduce available resources to the predicted level after a predetermined amount of time.

In response to logged variances from the current model, an adjustment step 71 may be periodically executed. Conventional statistical methods can be used to adjust the times or capacity levels associated with alert events.

What is claimed is:

1. A method of controlling the activation of pooled resources in a network, wherein the pooled resources include remotely startable and stoppable computing resources, wherein starting of each of the computing resources requires a respective startup time, the method comprising the steps of:
    establishing a resource utilization model including alert events for providing respective resource activation levels representing changes in said resource utilization model predicted to occur after the respective alert events;
    detecting occurrence of an alert event;
    when the detected alert event corresponds to an increase, then starting selected ones of the pooled resources; and
    when the detected alert event corresponds to a decrease, then checking an actual load level and stopping selected ones of the pooled resources when the actual load level is less than the respective resource activation level corresponding to the detected alert event.

2. The method of claim 1 wherein said alert events comprise time-of-day events.

3. The method of claim 1 wherein said alert events comprise day-of-week events.

4. The method of claim 1 wherein said alert events comprise date events.

5. The method of claim 1 wherein said alert events comprise a predetermined occurrence.

6. The method of claim 1 further comprising the step of generating a retry alert event after a predetermined period of time if said actual load level is not less than said respective resource activation level corresponding to said detected alert event representing a decrease.

7. The method of claim 1 further comprising the step of logging a resource utilization variance if said actual load level is not less than said respective resource activation level corresponding to said detected alert event representing a decrease.

8. The method of claim 1 further comprising the steps of:
    monitoring said actual load level; and
    adjusting said resource utilization model in response to said monitored actual load level.

9. The method of claim 1 wherein said computing resources are comprised of a plurality of blade servers, wherein said blade servers are mounted in at least one rack, and wherein each of said blade servers is each separately startable and stoppable under control of a predetermined blade server configured to operate as a management and control blade.

10. A network comprising:
    pooled resources including remotely startable and stoppable computing resources for performing data processing functions, wherein starting of each of the computing resources requires a respective startup time; and
    a management and control resource coupled to the pooled resources for remotely starting and stopping the computing resources, wherein the management and control resource executes a resource utilization model including alert events for providing respective resource activation levels representing changes in the resource utilization model predicted to occur after the respective alert events, wherein the management and control resource detects occurrence of an alert event, wherein the management and control resource starts selected ones of the pooled resources when the detected alert event corresponds to an increase, wherein the management and control resource monitors an actual load level, and wherein the management and control resource stops selected ones of the pooled resources when the detected alert event corresponds to a decrease and when the actual load level is less than the respective resource activation level corresponding to the detected alert event.

11. The network of claim 10 wherein said management and control resource includes a load balancer for monitoring actual load level of said pooled resources, and wherein said selected ones of said pooled resources are not stopped if said monitored actual load level is greater than said respective resource activation level corresponding to said detected alert event.

12. The network of claim 11 wherein said management and control resource modifies said resource utilization model in response to said monitored actual load level.

13. The network of claim 10 wherein said management and control resource generates a retry alert event after a predetermined period of time if said actual load level is not less than said respective resource activation level corresponding to said detected alert event representing a decrease.

14. The network of claim 10 wherein said management and control resource logs a resource utilization variance if said actual load level is not less than said respective resource activation level corresponding to said detected alert event representing a decrease.

15. The network of claim 10 wherein said management and control resource comprises an event comparator for comparing said alert events with a time register.

16. The network of claim 10 wherein said management and control resource comprises an event comparator for comparing said alert events with a predetermined occurrence.

17. The network of claim 10 wherein said computing resources are comprised of a plurality of blade servers, wherein said blade servers are mounted in at least one rack, and wherein each of said blade servers is each separately startable and stoppable under control of said management and control resource.

18. A management and control resource for coupling to pooled resources including remotely startable and stoppable computing resources for performing data processing functions, wherein starting of each of said computing resources requires a respective startup time, said management and control resource comprising:
    a resource utilization model including alert events for providing respective resource activation levels representing changes in said resource utilization model predicted to occur after said respective alert events;
    an event comparator for detecting occurrence of an alert event; and
    a controller for starting selected ones of said pooled resources when a detected alert event corresponds to a predicted increase in said resource activation levels, for monitoring an actual load level of said pooled resources, and for stopping selected ones of said pooled resources when a detected alert event corresponds to a predicted decrease in said resource activation levels and when said actual load level is less than said respective resource activation level corresponding to said detected alert event.

* * * * *